(12) United States Patent
Ahuto

(10) Patent No.: US 8,736,668 B2
(45) Date of Patent: May 27, 2014

(54) ELECTRONIC APPARATUS AND IMAGE PROCESSING METHOD

(75) Inventor: Eita Ahuto, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 300 days.

(21) Appl. No.: 13/156,888

(22) Filed: Jun. 9, 2011

(65) Prior Publication Data

US 2012/0056983 A1   Mar. 8, 2012

(30) Foreign Application Priority Data

Sep. 3, 2010   (JP) ................................. 2010-198186

(51) Int. Cl.
*H04N 13/00* (2006.01)

(52) U.S. Cl.
CPC ......... *H04N 13/0003* (2013.01); *H04N 13/007* (2013.01); *H04N 13/0062* (2013.01); *H04N 13/0048* (2013.01)
USPC .......................................................... 348/43

(58) Field of Classification Search
CPC combination set(s) only.
See application file for complete search history.

(56) References Cited

U.S. PATENT DOCUMENTS

| | | | |
|---|---|---|---|
| 7,254,265 B2* | 8/2007 | Naske et al. ................... | 382/154 |
| 8,116,369 B2* | 2/2012 | Choi et al. ................ | 375/240.01 |
| 8,139,925 B2* | 3/2012 | Sasaki et al. ................... | 386/329 |
| 2003/0060679 A1 | 3/2003 | Murata et al. | |
| 2008/0001972 A1* | 1/2008 | Callway et al. ............... | 345/660 |
| 2010/0103168 A1* | 4/2010 | Jung et al. ..................... | 345/419 |
| 2010/0134603 A1* | 6/2010 | Itoh ................................. | 348/58 |
| 2010/0141757 A1* | 6/2010 | Baik et al. ..................... | 348/135 |
| 2010/0150523 A1* | 6/2010 | Okubo et al. ................... | 386/68 |
| 2011/0096151 A1* | 4/2011 | Hulyalkar et al. ............... | 348/51 |
| 2011/0149022 A1* | 6/2011 | Klebanov et al. ............... | 348/42 |
| 2011/0169913 A1* | 7/2011 | Karaoguz et al. ............... | 348/42 |
| 2011/0261157 A1* | 10/2011 | Kiyama .......................... | 348/43 |
| 2013/0050416 A1* | 2/2013 | Iwasaki et al. .................. | 348/43 |
| 2013/0120527 A1* | 5/2013 | Shuto .............................. | 348/43 |

FOREIGN PATENT DOCUMENTS

| | | |
|---|---|---|
| JP | H 11289555 | 10/1999 |
| JP | 2002-091643 | 3/2002 |
| JP | 2003009185 | 1/2003 |

(Continued)

OTHER PUBLICATIONS

Japanese Patent Application No. 2010-198186, Notice of Reasons for Rejection, mailed Sep. 20, 2011, (with English Translation).

(Continued)

*Primary Examiner* — Dave Czekaj
*Assistant Examiner* — Tyler W Sullivan
(74) *Attorney, Agent, or Firm* — Blakely, Sokoloff, Taylor & Zafman LLP

(57) ABSTRACT

An electronic apparatus comprises a data extraction module, a mode setup module for setting a display mode, a first video signal generation module, a second video signal generation module, and a mixing module. The data extraction module is configured to extract first video data and second video data for displaying an object having a display position altered in accordance with an operation input from video content data. The first video signal generation module is configured to generate the first video data as 2D video, even when the display mode is set for 3D video display, when the second video data is extracted. The second video signal generation module is configured to generate a third (2D) video signal for the second video data such that the display position is changed in accordance with operation input. The mixing module is configured to mix the first video signal with the third video signal.

9 Claims, 5 Drawing Sheets

(56) References Cited

FOREIGN PATENT DOCUMENTS

| | | |
|---|---|---|
| JP | 2005065162 | 3/2005 |
| JP | 2005110120 | 4/2005 |
| JP | 2005175566 | 6/2005 |
| JP | 2010055344 | 3/2010 |
| JP | 2010-130495 | 6/2010 |
| JP | 2010130495 | 6/2010 |
| JP | 2011250321 | 12/2011 |

OTHER PUBLICATIONS

Japanese Patent Application No. 2010-198186, Notice of Reasons for Rejection, mailed Feb. 14, 2012, (with English Translation).

Japanese Patent Application No. 2012-164182, Notice of Reasons for Rejection, mailed May 21, 2013, (with English Translation).

* cited by examiner

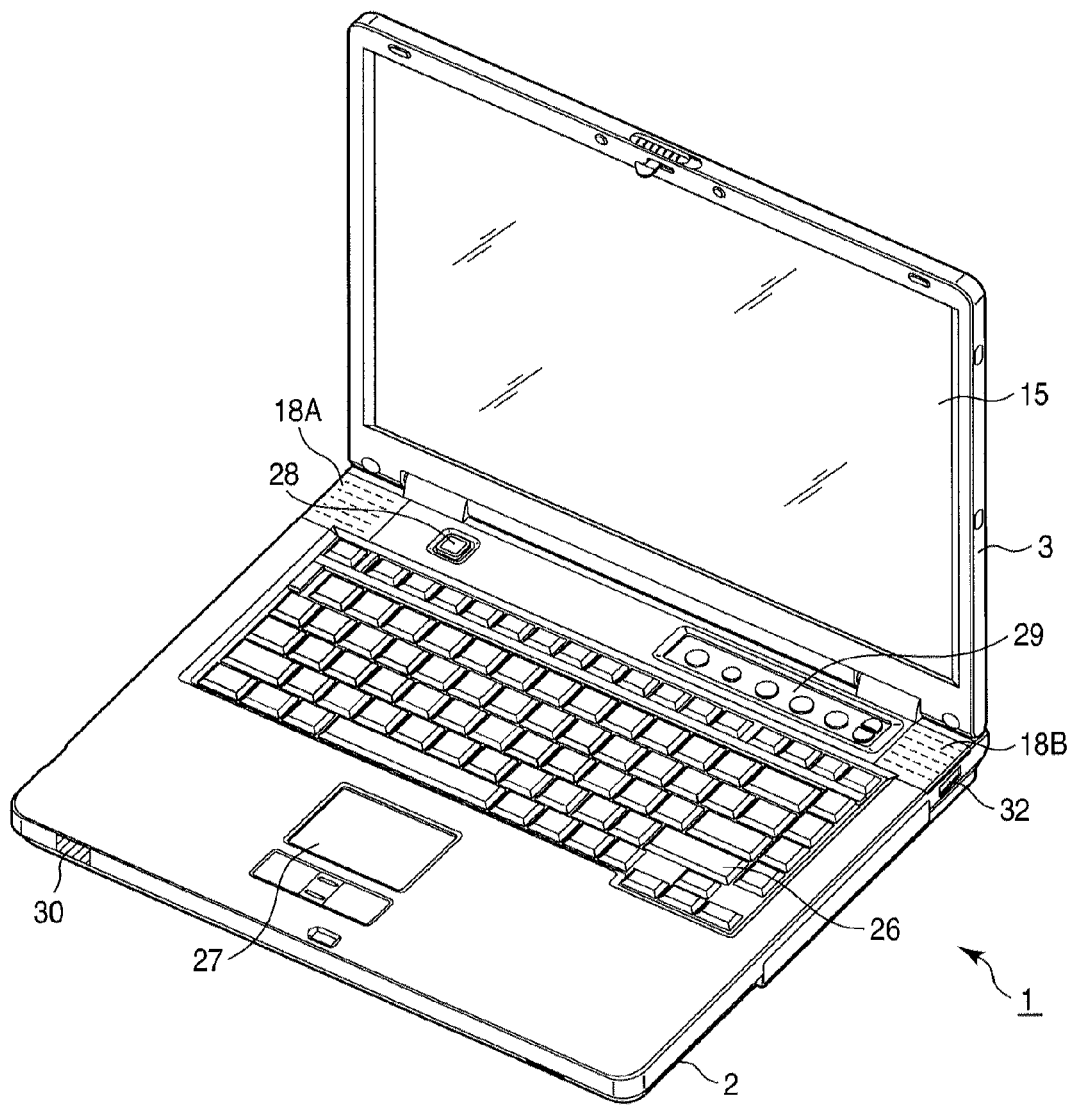
F I G. 1

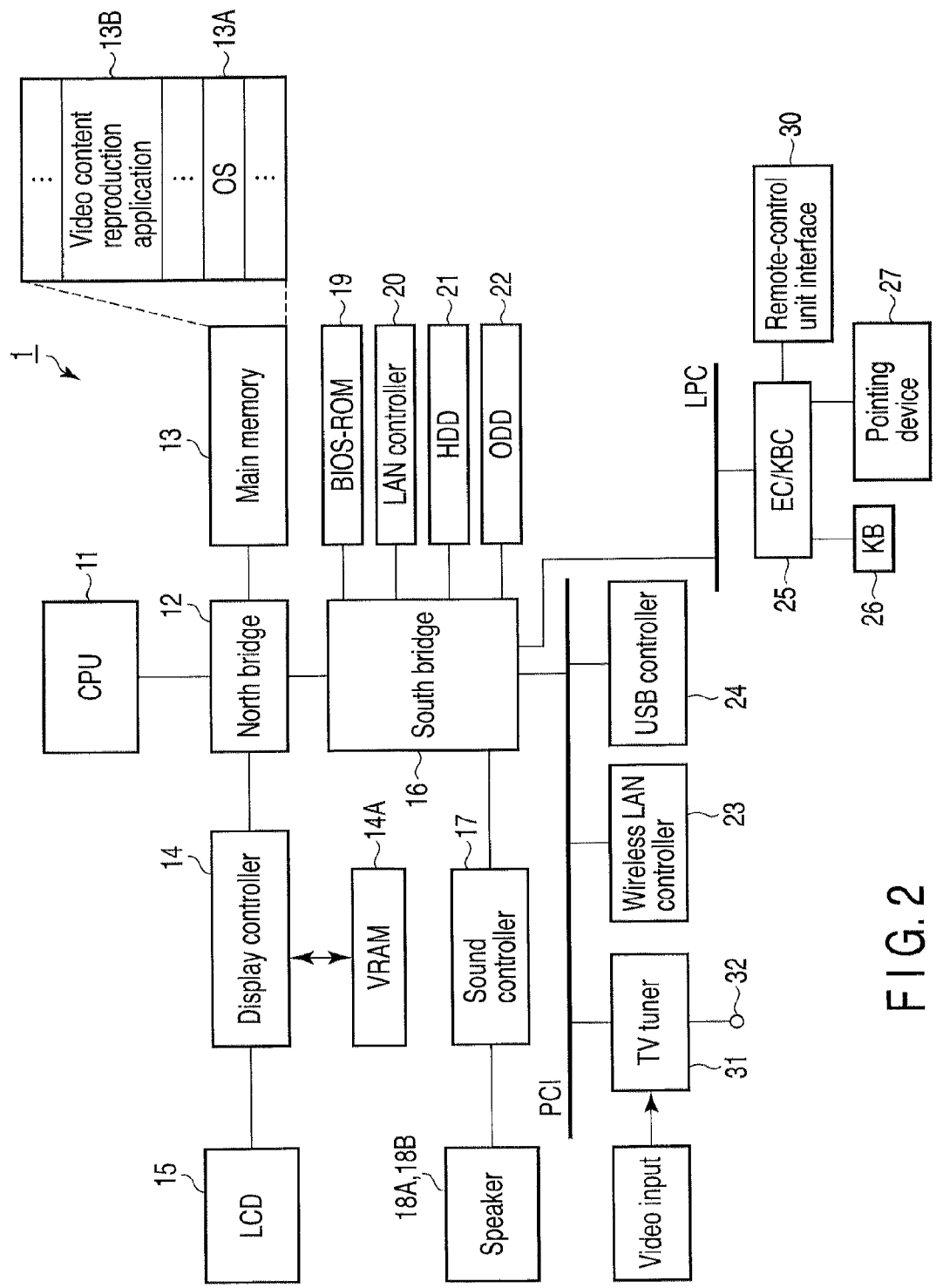
F I G. 2

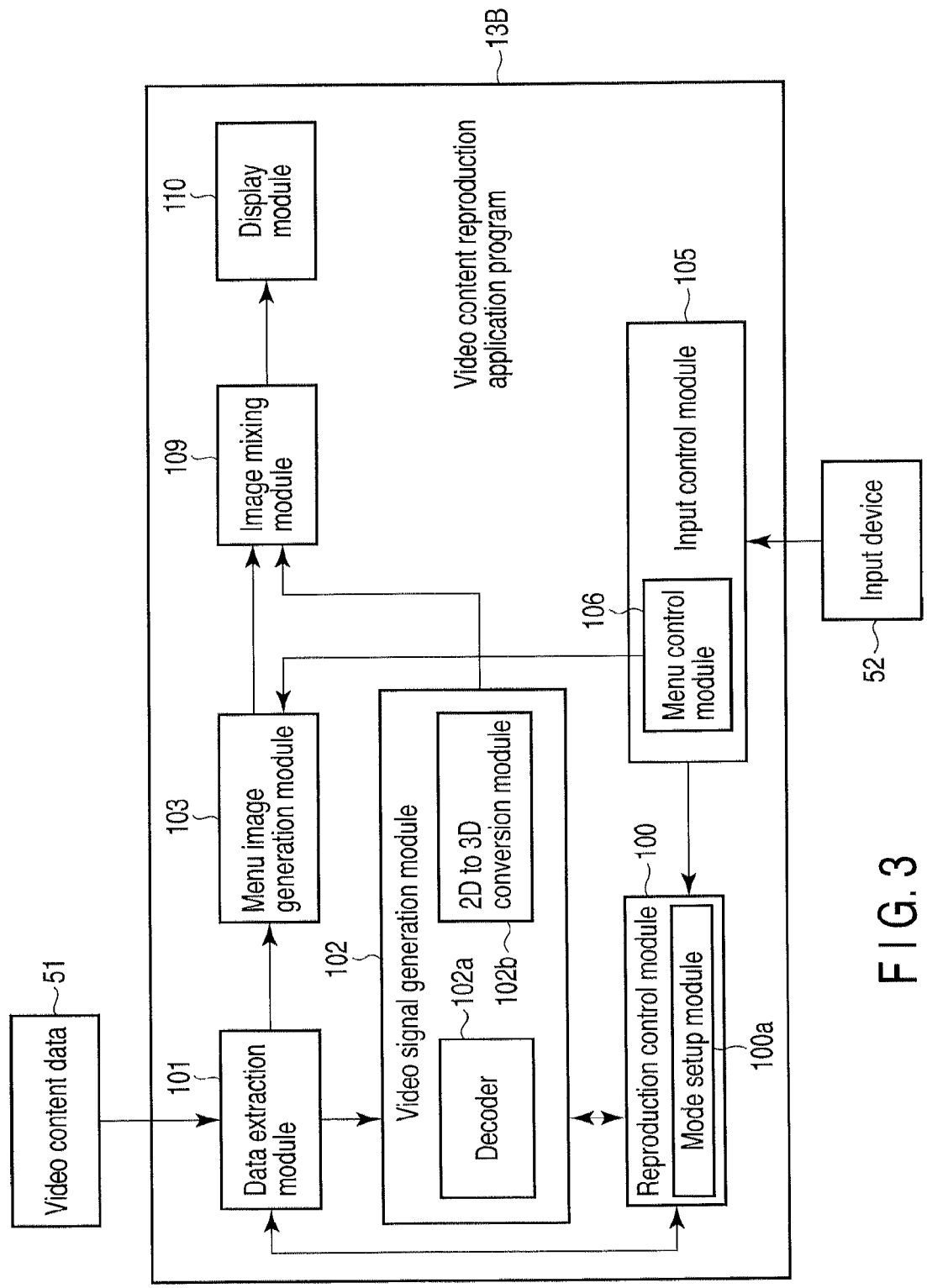
F I G. 3

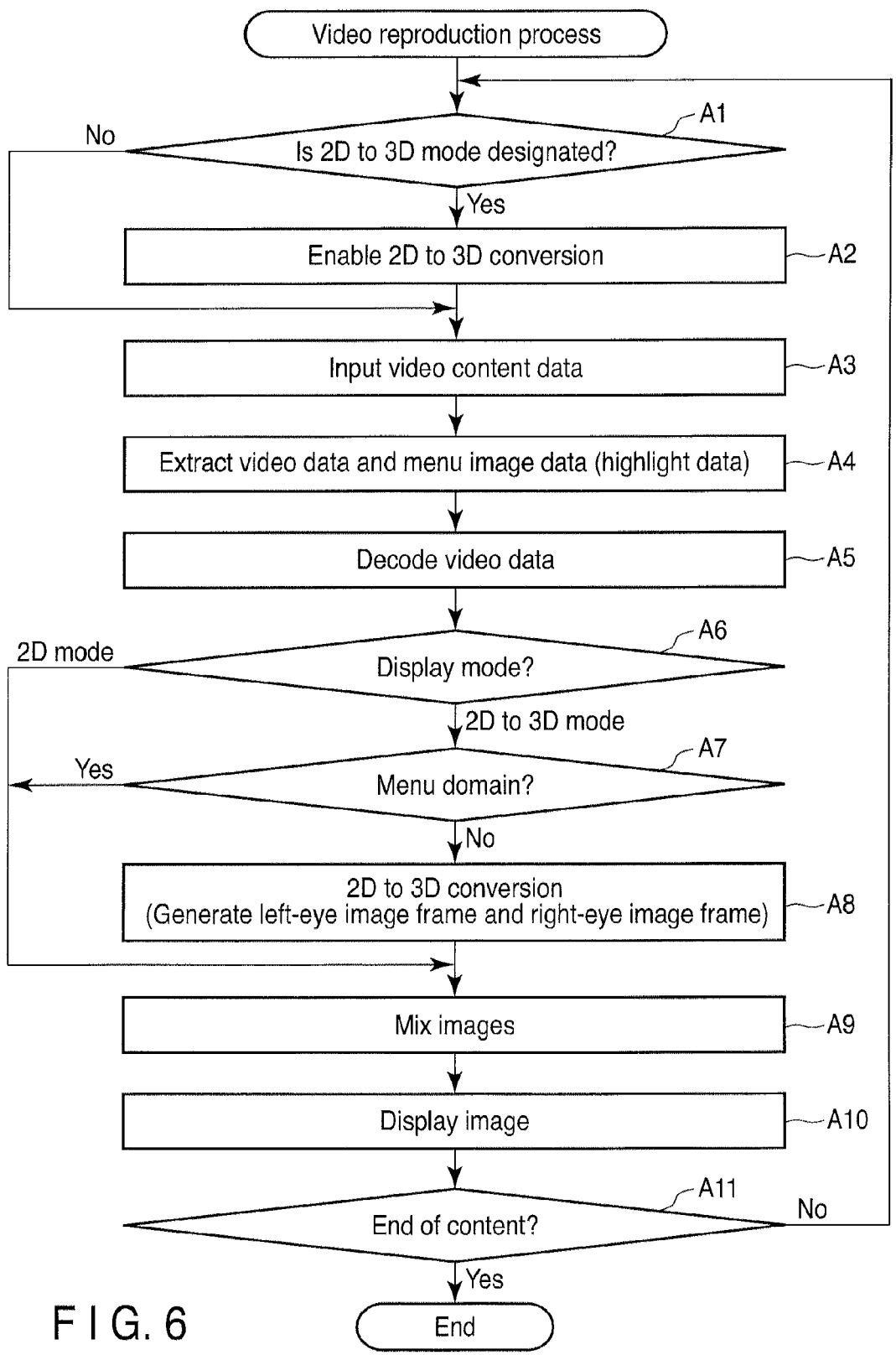
F I G. 6

ELECTRONIC APPARATUS AND IMAGE PROCESSING METHOD

CROSS-REFERENCE TO RELATED APPLICATIONS

This application is based upon and claims the benefit of priority from Japanese Patent Application No. 2010-198186, filed Sep. 3, 2010; the entire contents of which are incorporated herein by reference.

FIELD

Embodiments described herein relate generally to an electronic apparatus which reproduces 3D video content, and an image processing method which is applied to the electronic apparatus.

BACKGROUND

Conventionally, there are provided various video display apparatuses which enable viewing of 3D video. In such a video display apparatus, for example, a user is enabled to perceive 3D video (stereoscopic video) with use of left-eye video and right-eye video based on binocular parallax.

In general, most of video contents, which are provided by recording media such as DVDs (Digital Versatile Discs), or most of video contents, which are received via broadcast or networks, are video content data including 2D video. In order to view 3D video by using such video content data, various techniques have been proposed for converting 2D video to 3D video.

However, video content data includes not only 2D video which is an object of conversion to 3D video, but also video data which is not an object of conversion to 3D video. For example, video content data, which is provided by a DVD, etc., includes menu display data, as well as main title data. The video content data for menu display includes, for example, video data, the display of which is changed by a user operation, as well as video data for displaying menu option items and background video. An example of the video data, the display of which is changed by a user operation, is data which is displayed in accordance with the position of an option item of the menu (data of, e.g. highlight display for indicating a current option item), which is managed separately from video data which is an object of conversion to 3D video.

When 2D video is converted to 3D video, parallax images for the right eye and the left eye are generated based on, e.g. 2D video. Thus, if the parallax images and a highlight display, which is not converted to 3D video, are mixed and displayed, a displacement occurs. Specifically, the display position of an option item of the menu displayed as 3D video is displaced from the display position of a highlight display for indicating a current option item. In this case, it is not easily understood which option item is indicated by the display position of the highlight display, and a problem occurs in the user's operation of designating a desired option item from the menu.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view illustrating the external appearance of an electronic apparatus according to an embodiment.

FIG. 2 is an exemplary view illustrating the system configuration of a personal computer in the embodiment.

FIG. 3 is an exemplary block diagram illustrating the structure of a video content playback function of the embodiment.

FIG. 6 is an exemplary flow chart illustrating a video content reproduction function in the embodiment.

DETAILED DESCRIPTION

Figure 4:
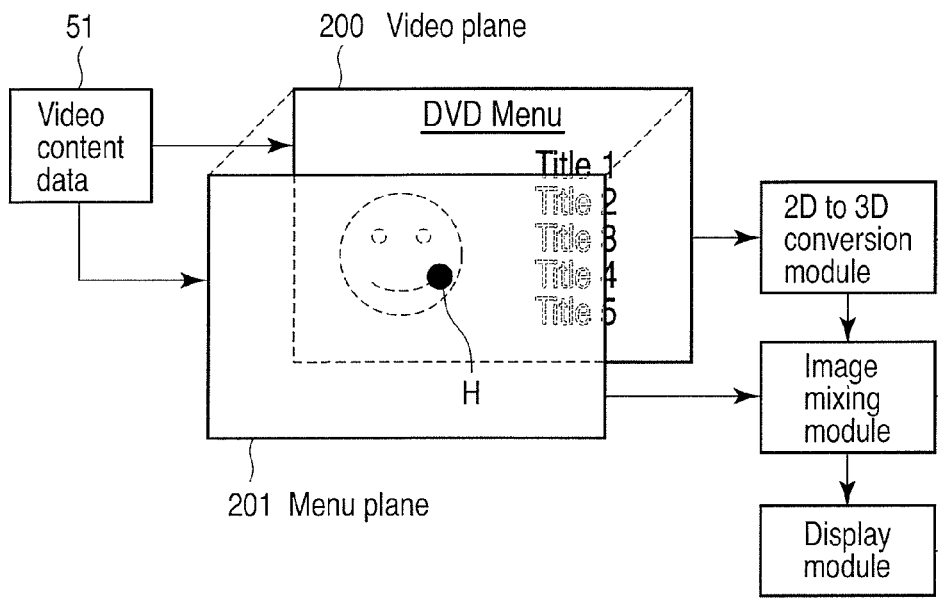
FIG. 4 is an exemplary view illustrating the relationship between video data and menu image data of a menu domain included in video content data in the embodiment.

Various embodiments will be described hereinafter with reference to the accompanying drawings.

In general, according to one embodiment, an electronic apparatus comprises a data extraction module, a mode setup module, a first video signal generation module, a second video signal generation module, a mixing module, and a display. The data extraction module is configured to extract first video data and second video data from video content data. The mode setup module is configured to set either a first display mode in which the video content data is displayed as 2D video or a second display mode in which the video content data is displayed as 3D video. The first video signal generation module is configured to generate a first video signal for 2D video corresponding to the first video data when the second display mode is set and the second video data is extracted, and to generate a second video signal for 3D video corresponding to the first video data when the second display mode is set and the second video data is not extracted. The second video signal generation module is configured to generate a third video signal corresponding to the second video data. The mixing module is configured to mix the first video signal with the third video signal. The display is configured to display a screen corresponding to a mixed video signal which is generated by the mixing module.

FIG. 1 is a perspective view showing the external appearance of an electronic apparatus according to an embodiment. The electronic apparatus is realized, for example, as a notebook-type personal computer 1. As shown in FIG. 1, the computer 1 comprises a computer main body 2 and a display unit 3.

A liquid crystal display (LCD) 15 is built in the display unit 3. The display unit 3 is attached to the computer main body 2 such that the display unit 3 is rotatable between an open position where the top surface of the computer main body 2 is exposed, and a closed position where the top surface of the computer main body 2 is covered.

The computer main body 2 has a thin box-shaped housing. A keyboard 26, a power button 28 for powering on/off the computer 1, an input operation panel 29, a pointing device 27, and speakers 18A and 18B are disposed on the top surface of the housing of the computer main body 2. Various operation buttons are provided on the input operation panel 29. The buttons include operation buttons for controlling a TV function (viewing, recording and reproduction of recorded broadcast program data/video data). A front surface of the computer main body 2 is provided with a remote-control unit interface module 30 for communicating with a remote-control unit which remote-controls the TV function of the computer 1. The remote-control unit interface module 30 is composed of, for example, an infrared signal reception module.

An antenna terminal 32 for TV broadcast is provided, for example, on a right-side surface of the computer main body 2. In addition, an external display connection terminal supporting, e.g. the high-definition multimedia interface (HDMI) standard is provided, for example, on a rear surface of the computer main body 2. This external display connection terminal is used for outputting video data (moving picture data) included in video content data, such as broadcast program data, to an external display.

FIG. 2 shows the system configuration of the personal computer 1 of the embodiment.

The personal computer 1, as shown in FIG. 2, includes a CPU 11, a north bridge 12, a main memory 13, a display controller 14, a video memory (VRAM) 14A, LCD 15, a south bridge 16, a sound controller 17, speakers 18A and 18B, a BIOS-ROM 19, a LAN controller 20, a hard disk drive (HDD) 21, an optical disc drive (ODD) 22, a wireless LAN controller 23, a USB controller 24, an embedded controller/keyboard controller (EC/KBC) 25, keyboard (KB) 26, pointing device 27, remote-control unit interface module 30, and a TV tuner 31.

The CPU 11 is a processor for controlling the operations of the respective components in the personal computer 1. The CPU 11 executes an operating system (OS) 13A and an application program, such as a video content reproduction application program 13B, which are loaded from the HDD 21 into the main memory 13. The video content reproduction application program 13B is software having a function for viewing video content data. The video content reproduction application program 13B executes a live reproduction process for viewing broadcast program data which is received by the TV tuner 31, a recording process for recording the received broadcast program data in the HDD 21, a reproduction process for reproducing broadcast program data/video data which is recorded in the HDD 21, and a reproduction process for reproducing video content data which is received via a network or video content data which is read from various recording media (DVD, CD (Compact Disc) by the optical disc drive (ODD) 22. Further, the video content reproduction application program 13B includes a function for viewing 3D video. The video content reproduction application program 13B converts 2D video, which is included in video content data, to 3D video in real time, and displays the 3D video on the screen of the LCD 15.

For the display of 3D video, use may be made of, for example, a shutter method (also referred to as "time-division method"). In the 3D video display by the shutter method, stereo-pair video including left-eye video data and right-eye video data is used. The LCD 15 is driven by a refresh rate (e.g. 120 Hz) which is double higher than the normal refresh rate (e.g. 60 Hz). The left-eye frame data in the left-eye video data and the right-eye frame data in the right-eye video data are alternately displayed on the LCD 15 with a refresh rate of, e.g. 120 Hz. For example, by using 3D glasses (not shown) such as liquid crystal shutter glasses, the user can view the image corresponding to the left-eye frame by the left eye and the image corresponding to the right-eye frame by the right eye. The 3D glasses may be configured to receive a sync signal, which indicates a display timing of the left-eye frame data and right-eye frame data, from the personal computer 1 by using, e.g. infrared. The left-eye shutter and right-eye shutter in the 3D glasses are opened/closed in synchronization with the display timing of the left-eye frame data and right-eye frame data on the LCD 15.

Alternatively, for the display of 3D video, use may be made of a polarization method such as an Xpol™ method. In this case, for example, interleaved frames, in which a left-eye image and a right-eye image are interleaved in units of, e.g. a scanning line, are generated, and the interleaved frames are displayed on the LCD 15. A polarizing filter covering the screen of the LCD 15 polarizes the left-eye image, which is displayed, for example, in odd-numbered lines on the screen of the LCD 15, and the right-eye image, which is displayed in even-numbered lines on the screen of the LCD 15, in different directions. By using polarization glasses, the user can view the left-eye image by the left eye and the right-eye image by the right eye.

Besides, the CPU 11 executes a BIOS (Basic Input/Output System) that is stored in the BIOS-ROM 19. The BIOS is a program for hardware control.

The north bridge 12 is a bridge device which connects a local bus of the CPU 11 and the south bridge 16. The north bridge 12 includes a memory controller which access-controls the main memory 13. The north bridge 12 also has a function of communicating with the display controller 14.

The display controller 14 is a device which controls the LCD 15 that is used as a display of the personal computer 1. A display signal, which is generated by the display controller 14, is sent to the LCD 15. The LCD 15 displays video, based on the display signal.

The south bridge 16 controls devices on a PCI (Peripheral Component Interconnect) bus and devices on an LPC (Low Pin Count) bus. The south bridge 16 includes an IDE (Integrated Drive Electronics) controller for controlling the HDD 21 and ODD 22, and a memory controller which access-controls the BIOS-ROM 19. The south bridge 16 also has a function of communicating with the sound controller 17 and LAN controller 20.

The sound controller 17 is a sound source device and outputs audio data, which is a target of reproduction, to the speakers 18A and 18B. The LAN controller 20 is a wired communication device which executes wired communication of, e.g. the Ethernet™ standard. The wireless LAN controller 23 is a wireless communication device which executes wireless communication of, e.g. the IEEE 802.11 standard. In addition, the USB controller 24 communicates with an external device via a cable of, e.g. the USB 2.0 standard.

The EC/KBC 25 is a one-chip microcomputer in which an embedded controller for power management and a keyboard controller for controlling the keyboard (KB) 26 and pointing device 27 are integrated. The EC/KBC 25 has a function of powering on/off the personal computer 1 in accordance with the user's operation. Further, the EC/KBC 25 has a function of communicating with the remote-control unit interface module 30.

The TV tuner 31 is a reception device which receives broadcast program data that is broadcast by a television (TV) broadcast signal, and the TV tuner 31 is connected to the antenna terminal 32. The TV tuner 31 is realized as a digital TV tuner which can receive a digital broadcast program data of, e.g. ground digital TV broadcast. In addition, the TV tuner 31 has a function of capturing video data which is input from an external device.

Next, referring to FIG. 3, a description is given of the structure of a video content reproduction function of the embodiment.

Video content data 51, which is source data that is a target of reproduction, is, for example, 2D video data which is read out from, e.g. a DVD. The video content data 51 includes video data for displaying video (moving picture). In addition, the video content data 51 includes, as a menu domain for displaying a menu screen, video data (first video data) for displaying video (moving picture) and additional data (second video data) for displaying an image which is processed separately from the video data. The additional data is, for example, data which is displayed on the menu screen and is displayed in accordance with the position of an option item of the menu (data of, e.g. highlight display for indicating a current option item). In the description below, the additional data is described as being menu image data.

As shown in FIG. 3, the video content reproduction application program 13B comprises a reproduction control module 100 (mode setup module 100a), a data extraction module 101, a video signal generation module 102 (a decoder 102a and a 2D to 3D conversion module 102b), a menu image generation module 103, an input control module 105 (a menu control module 106), an image mixing module 109, and a display module 110.

The reproduction control module 100 controls reproduction of video content. The reproduction control module 100 sets up a reproduction mode by the mode setup module 100a in accordance with a request from the user which is input via the input control module 105. The mode setup module 100a sets up either a 2D (two-dimensional) mode (first display mode) in which video content data is displayed as 2D video, or a 2D to 3D mode (second display mode) in which video content data is displayed as 3D video. Normally, the 2D mode is set for video content data for 2D video, and the 2D to 3D mode is set in accordance with a request from the user. In addition, the reproduction control module 100 determines a transition to a menu domain, based on data extracted by the data extraction module 101, and controls a process by the video signal generation module 102 (2D to 3D conversion module 102b) in accordance with this determination.

The data extraction module 101 extracts various data included in the input video content data 51, for instance, video data, audio data and menu image data. In the description below, the video data and menu image data are described as objects of processing. The data extraction module 101 outputs the extracted video data to the video signal generation module 102. In addition, the data extraction module 101 outputs the extracted menu image data to the menu image generation module 103. For example, video content data (menu domain), which is read out of a DVD, includes menu image data, in addition to video data for displaying option items and background video in a menu screen. The data extraction module 101 extracts menu image data from video content data for menu display.

The menu image generation module 103 generates a video signal for a menu image, based on the menu image data which has been output by the data extraction module 101. The menu image is, for example, a highlight display for indicating a current option item on the menu screen. The menu image is not limited to the highlight display, and may be a line, frame or specific color display. The relative positional relationship between the menu image and 2D video displayed on the background (e.g. option items of the menu) is preset.

The video signal generation module 102 generates a video signal of video that is to be displayed on the LCD 15, by using the video data that is a target of reproduction. When the video data that is the target of reproduction is data for displaying ordinary video (2D video), the video signal generation module 102 generates a video signal by executing a process of decoding generally encoded (compression-encoded) video data by the decoder 102a.

When the video data is to be displayed as 3D video, the video signal generation module 102 executes 2D to 3D conversion of the video data by the 2D to 3D conversion module 102b. Specifically, the 2D to 3D conversion module 102b generates, from the video data, a video signal of video (parallax image) including left-eye video (left-eye image frame) and right-eye video (right-eye image frame). To be more specific, using the video signal decoded by the decoder 102a, the 2D to 3D conversion module 102a analyzes the image frames of the video signal, thereby estimating the depth position (depth) of each pixel included in each image frame. The 2D to 3D conversion module 102b estimates the depth of each pixel, for example, by using the movement between image frames or the difference between pixel values in the image frame. Based on the estimated depth of each pixel, the 2D to 3D conversion module 102b generates a left-eye image frame and a right-eye image frame corresponding to the image frame. The video including the left-eye image frame and right-eye image frame is, for example, video in which the pixels of the left-eye video are displayed in odd-numbered scanning lines, and the pixels of the right-eye video are displayed in even-numbered scanning lines. In other words, in the video, left-eye video and right-eye video are alternately rendered in every other row. In the meantime, video may be created by a method of alternately rendering left-eye video and right-eye video in every other column.

The input control module 105 inputs a notification from an input device 52, which corresponds to a user operation. The input device 52 includes, for example, the keyboard 26 and a remote-control unit (not shown). The input control module 105 inputs a notification corresponding to a user operation on a predetermined key which is allocated on the keyboard 26, or a user operation on a button of the remote-control unit. When the 2D to 3D mode has been notified as the reproduction mode of the video content data 51, the input control module 105 notifies the reproduction control module 100 (mode setup module 100a). Besides, the input control module 105 includes the menu control module 106. When the menu screen is being displayed, the menu control module 106 changes the display position of the menu image data (highlight display) which is generated by the menu image generation module 103, in accordance with the user operation on the input device 52. Specifically, the menu control module 106 changes the present option item on the menu screen, by changing the display position of the highlight display in accordance with the instruction from the user.

The image mixing module 109 mixes the video signal which has been output by the video signal generation module 102 (decoder 102a, 2D to 3D conversion module 102b) and the video signal of the menu image which has been generated by the menu image generation module 103, and outputs the mixed signal to the display module 110.

The display module 110 displays on the screen of the LCD 15 the mixed image signal which has been generated by the image mixing module 109. Specifically, when a video signal for 3D video has been generated by the 2D to 3D conversion module 102b of the video signal generation module 102, the display module 110 displays each of the left-eye image frame and right-eye image frame, which have been output by the image mixing module 109, on the screen (LCD) 15 at a predetermined timing. In the shutter-type 3D video display, the display module 110 alternately displays the left-eye image frame and right-eye image frame on the LCD 15 at a predetermined refresh rate (e.g. 120 Hz). Using liquid crystal shutter glasses, for example, the user can view the left-eye image frame by the left eye and the right-eye image frame by the right eye. Thereby, the user can perceive a 3D image (stereoscopic image).

On the other hand, in the polarization-type 3D video display, the display module 110 generates an interleaved image frame in which, for example, the left-eye image frame and right-eye image frame are interleaved in units of a scanning line. The display module 110 displays the generated interleaved image frame on the LCD 15 at a predetermined refresh rate (e.g. 60 Hz). The displayed interleaved image frame is polarized by a polarizing filter which covers the screen of the LCD 15. Specifically the polarizing filter polarizes in different directions the left-eye image which is displayed, for example, in odd-numbered scanning lines on the screen, and the right-eye image which is displayed in even-numbered scanning lines on the screen. Using polarization glasses, the user can view the left-eye image by the left eye and the right-eye image by the right eye. Thereby, the user can perceive the 3D image (stereoscopic image).

FIG. 4 is an exemplary view illustrating the relationship between video data and menu image data of a menu domain included in the video content data 51 in the embodiment.

As shown in FIG. 4, the menu domain includes video data which displays option items, such as titles, in the menu screen, or video (moving picture) of a background, and menu image data such as a highlight display H, the display position of which is changed in accordance with a user operation.

The video data and menu image data, as shown in FIG. 4, are managed in different planes. When the video content data 51 is 2D to 3D converted in order to display the video content data 51 as 3D video, only the video data, which is managed in a video plane 200, is a target of conversion. On the other hand, since the menu image data, which is managed in a menu plane 201, is not a target of conversion, the menu image data is mixed with the 2D to 3D converted video data, and the mixed data is displayed.

Figures 5A, 5B, 5C:
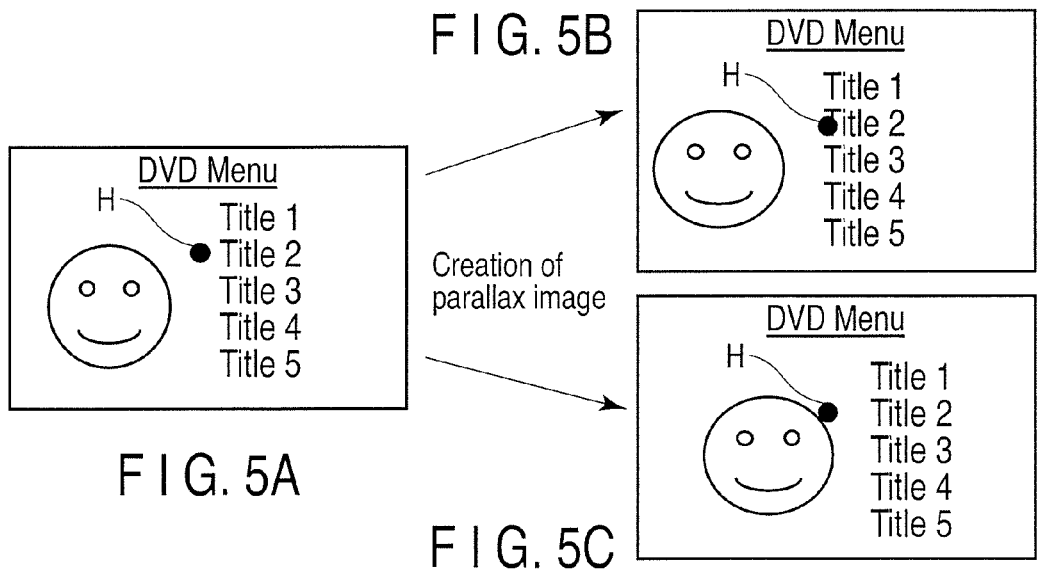
FIG. 5A, FIG. 5B, and FIG. 5C are exemplary views illustrating an example of a menu screen which is displayed in accordance with video content data in the embodiment.

FIG. 5A, FIG. 5B and FIG. 5C show an example of menu screen which is displayed in accordance with the video content data 51 (menu domain) in the embodiment.

FIG. 5A shows a menu screen which is displayed by the video content data 51 for 2D video. As shown in FIG. 5A, when a menu domain is displayed as standard 2D video, the display position of highlight display H (menu image data) is determined in accordance with the display position of option items such as titles, which are displayed by the video data. For example, if the change of the option item has been instructed by an operation on a cursor key while the menu screen shown in FIG. 5A is being displayed, the display position of the highlight display H is changed, for example, to the position where the next title is displayed.

When the menu domain is to be displayed as 3D video, as shown in FIG. 4, 2D to 3D conversion is executed based on the video data, and parallax images of a left-eye image frame and a right-eye image frame are generated. As shown in FIG. 5B and FIG. 5C, the display positions of the titles (option items) and background video are displaced from the positions in the original image.

On the other hand, since the menu image data, such as the highlight display H, is not an object of 2D to 3D conversion, the display position of the menu image data is unchanged. Thus, in the 3D video, the display position of the highlight display does not agree with the display position of the titles, and it becomes difficult to recognize, based on the display position of the highlight display H, which of the titles is being selected.

In the video content reproduction function of the embodiment, even in the case where the setup (2D to 3D mode) is executed to display the video content data 51 as 3D video, if the display object has transitioned to the menu domain, the 2D to 3D conversion of video data, which is extracted from the video content data 51, is disabled. Thereby, it is possible to prevent a problem of the menu operation from occurring due to the displacement between the 3D video (option items) and the menu image data (highlight display).

Next, referring to a flow chart of FIG. 6, the video content reproduction function in the embodiment is described.

The case is now described, by way of example, in which video content data 51 recorded on a DVD, which is read by the ODD 22, is reproduced. The video content data 51 recorded on the DVD is data for 2D video, and includes menu display data (menu domain) as well as main title data. The menu domain includes menu image data for highlight display indicating a present option item, as well as video data for displaying option items and background video in a menu screen.

If a request for starting reproduction of the video content data 51 has been input via the input control module 105, the reproduction control module 100 reads in the video content data 51 and starts the reproduction process.

When the 2D to 3D mode is not set (No in block A1), the video content reproduction application 13B reproduces the video content data 51 as 2D video. The data extraction module 101 inputs thereto the video content data 51 (block A3) and extracts video data and menu image data from the video content data 51 (block A4). When the input video content data 51 is main title data, however, the menu image data is not extracted.

The video signal generation module 102 decodes, by the decoder 102a, the video data which has been extracted by the data extraction module 101 (block A5). When the 2D to 3D mode is not set ("2D mode" in block A6), the 2D to 3D conversion module 102b is disabled. Thus, a video signal, which has been generated by the decoding by the decoder 102a, is output to the image mixing module 109.

The image mixing module 109 mixes the video signal which has been output from the video signal generation module 102 (decoder 102a), and the video signal which has been output from the menu image generation module 103 (block A9). When the video content data 51 is not the menu domain (i.e. when the video content data 51 is the main title data), the video signal which has been output from the video signal generation module 102 is the target of reproduction.

The display module 110 displays on the screen of the LCD 15 the video signal which has been mixed by the image mixing module 109 (block A10). In this case, since the 2D to 3D mode is not set, the 2D video is displayed. Then, the above-described process is continued (No in block A11) until the read-out of the video content data 51 is completed (Yes in block A11).

On the other hand, if the setup of the 2D to 3D mode has been requested by the user operation on the input device 52, the input control module 105 notifies the reproduction control module 100. The mode setup module 100a of the reproduction control module 100 sets the reproduction mode of the video content data 51 to be the 2D to 3D mode.

When the 2D to 3D mode is set (Yes in block A1), the reproduction control module 100 enables the 2D to 3D conversion module 102b (block A2). Specifically, the video content playback application 13B enables the video content data 51, excluding the menu domain, to be reproduced as 3D video. The data extraction module 101 inputs thereto the video content data 51 (block A3) and extracts video data and menu image data from the video content data 51 (block A4). When the input video content data 51 is main title data, however, the menu image data is not extracted.

The video signal generation module 102 decodes, by the decoder 102a, the video data which has been extracted by the data extraction module 101 (block A5). When the 2D to 3D mode is set ("2D to 3D mode" in block A6) and when the data which is a target of extraction by the data extraction module

101 is not the menu domain, the reproduction control module 100 executes 2D to 3D conversion by the 2D to 3D conversion module 102*b*.

The 2D to 3D conversion module 102*b* generates a left-eye image frame and a right-eye image frame by using the video signal which has been generated by the decoding by the decoder 102*a* (block A8; Yes output from block A7).

The image mixing module 109 mixes the video signal which has been output from the video signal generation module 102 (2D to 3D conversion module 102*b*), and the video signal which has been output from the menu image generation module 103 (block A9). When the video content data 51 is not the menu domain (i.e. when the video content data 51 is the main title data), the video signal which has been output from the video signal generation module 102 is the target of reproduction.

The display module 110 displays on the screen of the LCD 15 the video signal which has been mixed by the image mixing module 109. In this case, since the 2D to 3D mode is set, the 3D video is displayed.

In the case where the 2D to 3D mode is set, if the reproduction control module 100 determines that the data, which is a target of extraction by the data extraction module 101, has transitioned to the menu domain (Yes in block A7), the reproduction control module 100 disables the 2D to 3D conversion module 102*b*.

Thus, the video signal generation module 102 decodes, by the decoder 102*a*, the video data which is extracted by the data extraction module 101, and outputs the video signal. In other words, the video signal generation module 102 does not execute 2D to 3D conversion of the video data, and outputs the video signal for displaying 2D video of option items, such as titles, and a background in the menu screen. In addition, the menu image generation module 103 generates, for example, a video signal for effecting a highlight display in the menu screen, based on the menu image data which has been extracted by the data extraction module 101, and outputs the generated video signal to the image mixing module 109.

The image mixing module 109 mixes the video signal which has been output from the video signal generation module 102 (decoder 102*a*), and the video signal which has been output from the menu image generation module 103 (block A9). The display module 110 displays video (menu screen) corresponding to the video signal which has been mixed by the image mixing module 109.

In the menu screen, the option items such as titles are displayed as 2D video, and thus the display position of the highlight display agrees with the display position of the option items. Specifically, even in the case where the 2D to 3D mode is set, the menu screen is displayed in the 2D mode. Therefore, there occurs no such problem of the menu operation as described with reference to FIG. 5B and FIG. 5C.

When the display of the menu screen is terminated, the reproduction control module 100 enables the 2D to 3D conversion module 102*b*, so that the video content data 51 may be displayed as 3D video.

As has been described above, in the personal computer 1 in the embodiment, the video content data 51 for 2D video can be displayed as 3D video by executing the video content reproduction application 13B. Even in the case where the 2D to 3D mode is set, when the menu screen, in which a positional displacement from the menu image data (e.g. highlight display) occurs due to 3D visualization, is displayed, the 2D to 3D conversion is disabled and a problem of the menu operation can be avoided.

In the above description, the embodiment has been described as being realized by the personal computer 1. Alternatively, the embodiment may be realized by other electronic apparatuses which display video. For example, the embodiment can be realized by a TV, a mobile phone, an optical disc player, a car navigation, etc.

The process that has been described in connection with the embodiment may be stored as a computer-executable program in a recording medium such as a magnetic disk (e.g. a flexible disk, a hard disk), an optical disk (e.g. a CD-ROM, a DVD) or a semiconductor memory, and may be provided to various apparatuses. The program may be transmitted via communication media and provided to various apparatuses. The computer reads the program that is stored in the recording medium or receives the program via the communication media. The operation of the apparatus is controlled by the program, thereby executing the above-described process.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a data extraction module configured to extract, from video content data, (i) first video data comprising two-dimensional (2D) video and (ii) second video data for displaying an object at a display position when displayed on a display screen, the display position configured to change in accordance with an operation input;
   a mode setup module configured to set either a first display mode in which the video content data is displayed as 2D video or a second display mode in which the video content data is converted from 2D video data to three-dimensional (3D) video data and displayed as 3D video;
   a first video signal generation module configured to generate (1) a first video signal for display in 2D corresponding to the first video data when the second display mode is set and the second video data is extracted, and (2) a second video signal for display in 3D corresponding to the first video data when the second display mode is set and the second video data is not extracted;
   a second video signal generation module configured to generate a third video signal for display in 2D corresponding to the second video data wherein the display position is displayed on a display screen, the display position configured to change in accordance with the operation input;
   a mixing module configured to mix the first video signal with the third video signal when the second display mode is set and the second video data is extracted; and
   a display configured to display a screen corresponding to a mixed video signal which is generated by the mixing module.

2. The electronic apparatus of claim 1, wherein the first video signal generation module comprises:

a decoder configured to output the first video signal by decoding the first video data; and a conversion module configured to create a parallax image for display in 3D, based on the first video signal, and to output the second video signal corresponding to the parallax image.

3. The electronic apparatus of claim 1, wherein a display position of the second video data in the screen is determined in accordance with display position of items which are displayed by the first video data.

4. An image processing method comprising:
extracting, from video content data, (i) first video data comprising two-dimensional (2D) video and (ii) second video data for displaying an object at a display position when displayed on a display screen, the display position configured to change in accordance with an operation input;
setting either a first display mode in which the video content data is displayed as 2D video or a second display mode in which the video content data is converted from 2D video data to three-dimensional (3D) video data and displayed as 3D video;
generating a first video signal for display in 2D corresponding to the first video data when the second display mode is set and the second video data is extracted;
generating a second video signal for display in 3D corresponding to the first video data when the second display mode is set and the second video data is not extracted;
generating a third video signal for display in 2D corresponding to the second video data wherein the display position is displayed on a display screen, the display position configured to change in accordance with the operation input;
mixing the first video signal with the third video signal when the second display mode is set and the second video data is extracted; and
displaying a screen corresponding to a mixed video signal which is generated by the mixing module.

5. The method of claim 4, further comprising:
outputting the first video signal by decoding the first video data;
creating a parallax image for display in 3D, based on the first video signal; and
outputting the second video signal corresponding to the parallax image.

6. The method of claim 4, wherein a display position of the second video data in the screen is determined in accordance with display position of items which are displayed by the first video data.

7. A non-transitory computer readable medium having stored thereon a computer program which is executable by a computer, the computer program controlling the computer to execute functions of:
extracting, from video content data, (i) first video data comprising two-dimensional (2D) video and (ii) second video data for displaying an object at a display position when displayed on a display screen, the display position configured to change in accordance with an operation input;
setting either a first display mode in which the video content data is displayed as 2D video or a second display mode in which the video content data is converted from 2D video data to three-dimensional (3D) video data and displayed as 3D video;
generating a first video signal for display in 2D corresponding to the first video data when the second display mode is set and the second video data is extracted;
generating a second video signal for display in 3D corresponding to the first video data when the second display mode is set and the second video data is not extracted;
generating a third video signal for display in 2D corresponding to the second video data wherein the display position is displayed on a display screen, the display position configured to change in accordance with the operation input;
mixing the first video signal with the third video signal when the second display mode is set and the second video data is extracted; and
displaying a screen corresponding to a mixed video signal which is generated by the mixing.

8. The computer readable medium of claim 7, wherein the computer program controls the computer to further execute a function of:
outputting the first video signal by decoding the first video data;
creating a parallax image for display in 3D, based on the first video signal; and
outputting the second video signal corresponding to the parallax image.

9. The computer readable medium of claim 7, wherein a display position of the second video data in the screen is determined in accordance with display position of items which are displayed by the first video data.

* * * * *